INVENTORS
HARRY A. SCHMEHL
FREDERIC H. WRIGHT
BY
ATTORNEY 2,866,553

SEPARATION OF SOLID PARTICLES OF DIFFERENT SIZES

Harry A. Schmehl, Kimberton, Pa., and Frederic H. Wright, Plainfield, N. J.

Application January 6, 1956, Serial No. 557,733

6 Claims. (Cl. 209—359)

This invention relates to the screening of solid particles of different sizes; and, more particularly, it is directed to the sizing and separation thereof by improvements in screening apparatus and screening techniques.

It is among the primary objects of this invention to provide a method and apparatus:

(1) For the separation of solid materials of different particle sizes whereby the quantity of material screened during a given period of time is increased;

(2) For the screening of solid particles of different sizes whereby the life of the screen is prolonged;

(3) For the screening and separation of solid particles of different sizes whereby the blinding of the screen openings is eliminated or substantially reduced;

(4) For the screening and separation of solid particles of different sizes, wherein the screens are immobile or non-vibratory during the screening operation;

(5) For the screening and separation of solid particles of different sizes in apparatus that is stationary and devoid of moving parts;

(6) For the screening and separation of solid particles of different sizes whereby the coarse particles are repeatedly swept across the screens to clean them;

(7) For an increase in the efficiency of the screens used for the sizing or separation of solid particles of different sizes.

In one of its fundamental aspects, the present invention comprises imparting turbulence or helical or spiral movement to a stream of said particles (as by introducing the same into a whirling stream or column of air), and moving the whirled stream of particles across the face of a screen in such wise that the peripheral portion of said turbulent stream is maintained substantially in continuous contact with the screen, whereby the fines pass through the screen and the larger size particles are separated therefrom. The present invention further includes within its scope, apparatus for separating the solid particles of different sizes, which comprises a duct-like compartment for containing a flowing mass of said particles, the walls of said duct comprising oppositely disposed particle filtering screens between which the stream of particles is directed, and means for creating and maintaining the stream of particles in a turbulent state whereby the marginal or peripheral portions of the stream repeatedly come in contact with the aforesaid oppositely disposed screens to the end that the fines pass there-through and the larger size particles are separated therefrom and are thus sized and collected.

A fuller understanding of this invention and the manner in which its objectives and advantages may be realized will become apparent from the following detailed description thereof, taken in connection with the accompanying drawing, where:

Figure 1:
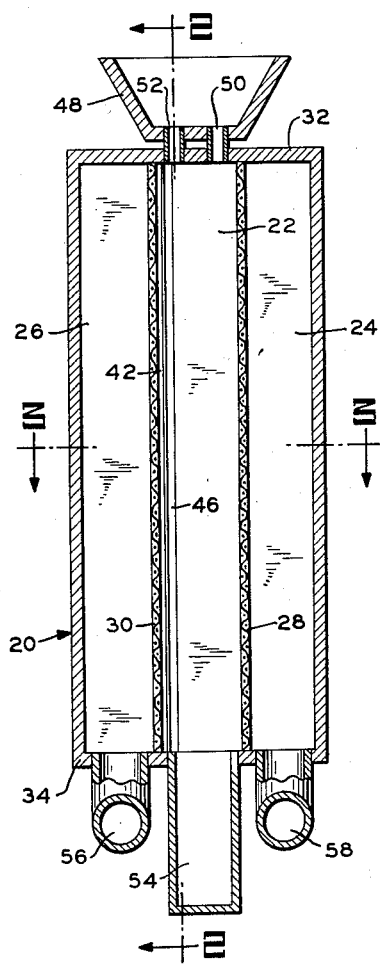
Fig. 1 is a vertical, cross-sectional view of an embodiment of an apparatus of the present invention.
Figure 2:
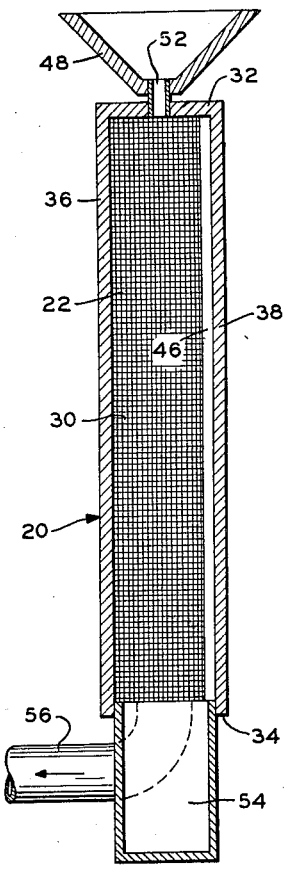
Fig. 2 is a sectional view of the structure illustrated in Fig. 1, taken on the line 2—2 thereof.

Referring now to the drawing, the numeral 20, designates a rectangularly shaped casing which is divided into a central compartment 22, and two flanking compartments 24 and 26, disposed respectively, on opposite sides of 22. The partitioning of the casing or chamber 20 into said three compartments is effectuated by the oppositely disposed, substantially parallel screens or sieves 28 and 30 which extend within the casing from the top 32 to the bottom 34 thereof, and from the front wall 36 to the oppositely disposed back wall 38. Each screen constitutes a wall common to compartment 22 and a flanking compartment.

Figure 3:
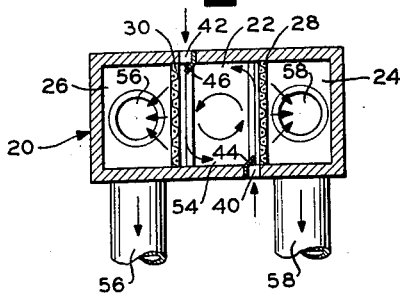
Fig. 3 is a sectional view of the structure illustrated in Fig. 1, taken on the line 3—3 thereof.

A pair of slots 40 and 42 in walls 36 and 38 respectively of casing 20, disposed diagonally with respect to each other, extend from the bottom 34 to the top 32. As may best be seen in Fig. 3 these slots provide for drawing air into the central compartment 22 in a vertical plane along a vertical edge of each of the screens 28 and 30. Each of said slots is provided with a deflector or baffle 44 and 46, respectively, extending into 22 by means of which the "thickness" or "thinness" of the air stream impinging on the screen may be adjusted or controlled.

A hopper 48 mounted on the top 32 of 20 above the central compartment 22 communicates with 22 by means of conduits 50 and 52. A receiving bin 54 is provided at the bottom or discharge end of chamber 22. Conduits 56 and 58 lead, respectively, from the flanking compartments 24 and 26 to a collector (not shown).

In operation, a mass of particles of different sizes that is to be subjected to the sizing operation, is fed to the hopper 48 from which it flows in two streams through conduits 50 and 52 into 22. Simultaneously, two thin streams of air at high velocity, enter 22, through the longitudinally extending slots 40 and 42, being drawn into 22 in veritical planes along one vertical edge of each screen, such indrawing being effectuated by suitable air suction means, or fans, (not shown), connected by means of suitable ducts to the conduits 56 and 58. Part of the air streams thus entering 22 are drawn through the screens 28 and 30, while the balance thereof pass across the face of each screen, thus creating a whirling column of air that circulates the particles, descending from the hopper, around and around in a descending spiral or helical path within the central chamber 22. The course particles are thus swept repeatedly across the two opposed screen faces and cleaned. Fines, i. e., screen undersize particles, pass through the screens and enter the compartments 24 and 26 and thence flow through conduits 56 and 58, to a collector (not shown).

The larger (screen oversize) particles continue in their downward spiral or helical course until they fall into the receiving bin therefor.

It has been found that the instant apparatus and device is particularly useful in sieving or screening particles of the order of 100 mesh (149 microns) and finer.

The apparatus is useful, however, in processing particles of any size. It will be apparent, also, that air suction, air speed, feed rate, screen mesh size and the dimensions of the apparatus may be adjusted or arranged in consequence of the type of material to be processed.

It will now be evident from the foregoing description that the separation of solid particles of different sizes can be effectuated in an apparatus devoid of moving parts; and blinding of the screen openings is eliminated or substantially reduced, since the particles caught in the screen openings are subjected to the brushing effect of the larger particles in the turbulent mass which continuously strikes the screens. Furthermore, that the life of the screens is prolonged since the screens do not move or vibrate during the screening operations. It has also been found that the instant invention makes it possible markedly to increase the quantity of material per unit area of screen surfaces which can be screened in a given time.

Although the invention has been described in detail with respect to a currently preferred embodiment thereof, those skilled in the art will understand after reading this specification that various changes and modifications may be made without departing from the spirit of the invention and the scope of the appended claims.

Accordingly, the appended claims are to be construed as defining the invention within the full spirit and the scope thereof.

We claim:

1. A devices for separating solid particles of different sizes comprising a chamber having a central vertical compartment flanked by a compartment on opposite sides thereof, a pair of spaced apart screens each comprising a wall common to the central compartment and one of the flanking compartments, each of said flanking compartments having means for operative connection with air suction means for drawing air from said chamber, and inlet means for permitting the passage of a stream of air into and lengthwise of said central compartment.

2. A device for separating solid particles of different sizes comprising a vertically disposed chamber having a vertically disposed compartment flanked by a vertically disposed compartment on opposite sides thereof, a pair of vertically disposed spaced apart screens, each screen comprising a wall common to the central compartment and one of the flanking compartments, each of said flanking compartments having means for operative connection to air suction means for drawing air from said chamber, and vertically disposed inlet means for directing a stream of air circumferentially into said central compartment.

3. A device for separating solid particles of different sizes comprising a vertically disposed chamber having a vertically disposed compartment flanked by a vertically disposed compartment on opposite sides thereof, a pair of vertically disposed spaced apart screens, each screen comprising a wall common to the central compartments and one of the flanking compartments, each of said flanking compartments having means for operative connection to air suction means for drawing air from said chamber, and vertically disposed air inlets in said central compartment for directing a stream of air into said chamber in a vertical plane along a vertical edge of the aforesaid screens.

4. A device for separating solid particles of different sizes comprising a vertically disposed chamber having vertically disposed central compartment flanked by a vertically disposed compartment on opposite sides thereof, a pair of vertically disposed spaced apart screens, each screen comprising a wall common to the central compartment and one of the flanking compartments, the lower extremity of each of said flanking compartments having means for operative connection with air suction means for drawing air from said chamber through said screen, vertically disposed air inlets in said central compartment for directing a stream of air into said chamber in a vertical plane along a vertical edge of the aforesaid screens, and means, at the top of the central compartment, for entry of a stream of said particles.

5. A device for separating solid particles of different sizes comprising a vertically disposed chamber having a vertically disposed central compartment flanked by a vertically disposed compartment on opposite sides thereof, a pair of vertically disposed spaced apart screens, each screen comprising a wall common to the central compartment and one of the flanking compartments, air suction means, each of said flanking compartments having means for operative connection with said air suction means, and vertically disposed air inlet slots in said central compartment for the drawing in of a stream of air in a vertical plane along a vertical edge of the aforesaid screens.

6. A structure in accordance with claim 5, including baffling means in association with the said air inlet slots.

References Cited in the file of this patent

UNITED STATES PATENTS

| 544,036 | Ginn | Aug. 6, 1895 |
| 2,219,453 | Mosley | Oct. 29, 1940 |
| 2,389,715 | Beardsley | Nov. 27, 1945 |

FOREIGN PATENTS

| 10,576 | Great Britain | 1885 |
| 903,681 | Germany | Feb. 8, 1954 |